(12) United States Patent
Areh et al.

(10) Patent No.: US 7,193,171 B2
(45) Date of Patent: Mar. 20, 2007

(54) ELECTRICAL KITCHEN APPLIANCE

(75) Inventors: Marko Areh, Radje Ob Dravi (SI); Henrik Pavlovic, Ljubno Ob Savinji (SI); Igor Zibret, Smartno Ob Paki (SI)

(73) Assignee: BSH Bosch und Siemens Hausgeraete GmbH, Munich (DE)

( * ) Notice: Subject to any disclaimer, the term of this patent is extended or adjusted under 35 U.S.C. 154(b) by 398 days.

(21) Appl. No.: 10/791,546

(22) Filed: Mar. 1, 2004

(65) Prior Publication Data

US 2004/0194647 A1  Oct. 7, 2004

Related U.S. Application Data

(63) Continuation of application No. PCT/EP02/09467, filed on Aug. 23, 2002.

(30) Foreign Application Priority Data

Aug. 30, 2001  (DE) .................... 101 42 503

(51) Int. Cl.
*H01H 13/70* (2006.01)

(52) U.S. Cl. .............. 200/343; 200/296; 200/520

(58) Field of Classification Search ............. 200/343, 200/296, 293, 520, 16 D, 16 R, 341, 534
See application file for complete search history.

(56) References Cited

U.S. PATENT DOCUMENTS

| 2,849,590 | A |   | 8/1958 | Stiebel |
| 4,620,476 | A |   | 11/1986 | Brym |
| 5,285,038 | A | * | 2/1994 | Asher et al. ............. 200/314 |
| 5,422,447 | A | * | 6/1995 | Spence .................. 200/5 A |
| 5,990,432 | A | * | 11/1999 | Kuroda .................. 200/343 |
| 6,192,815 | B1 | * | 2/2001 | Duttenhofer ............ 112/277 |
| 6,255,610 | B1 | * | 7/2001 | Botz et al. ............. 200/315 |
| 6,392,179 | B1 | * | 5/2002 | Schwarzbich ........... 200/520 |
| 6,495,780 | B1 | * | 12/2002 | Tucci et al. ............ 200/302.1 |
| 6,570,111 | B2 | * | 5/2003 | Nakagawa et al. ....... 200/343 |

FOREIGN PATENT DOCUMENTS

| DE | 92 05 628.8 U1 | 7/1992 |
| EP | 0 278 018 A1 | 8/1988 |
| EP | 0 362 058 B1 | 9/1992 |

* cited by examiner

*Primary Examiner*—K. Lee
(74) *Attorney, Agent, or Firm*—Russell W. Warnock; Craig J. Loest

(57) ABSTRACT

An outer wall is created for an electrical kitchen appliance and has a formation of recesses defining strips. A button is disposed on the strips. Regions embodied as film hinges are provided between the strips, enabling them, and thus the button disposed in-between the same, to pivot, in order to actuate an electrical button or a switch inside the housing of the kitchen appliance.

20 Claims, 1 Drawing Sheet

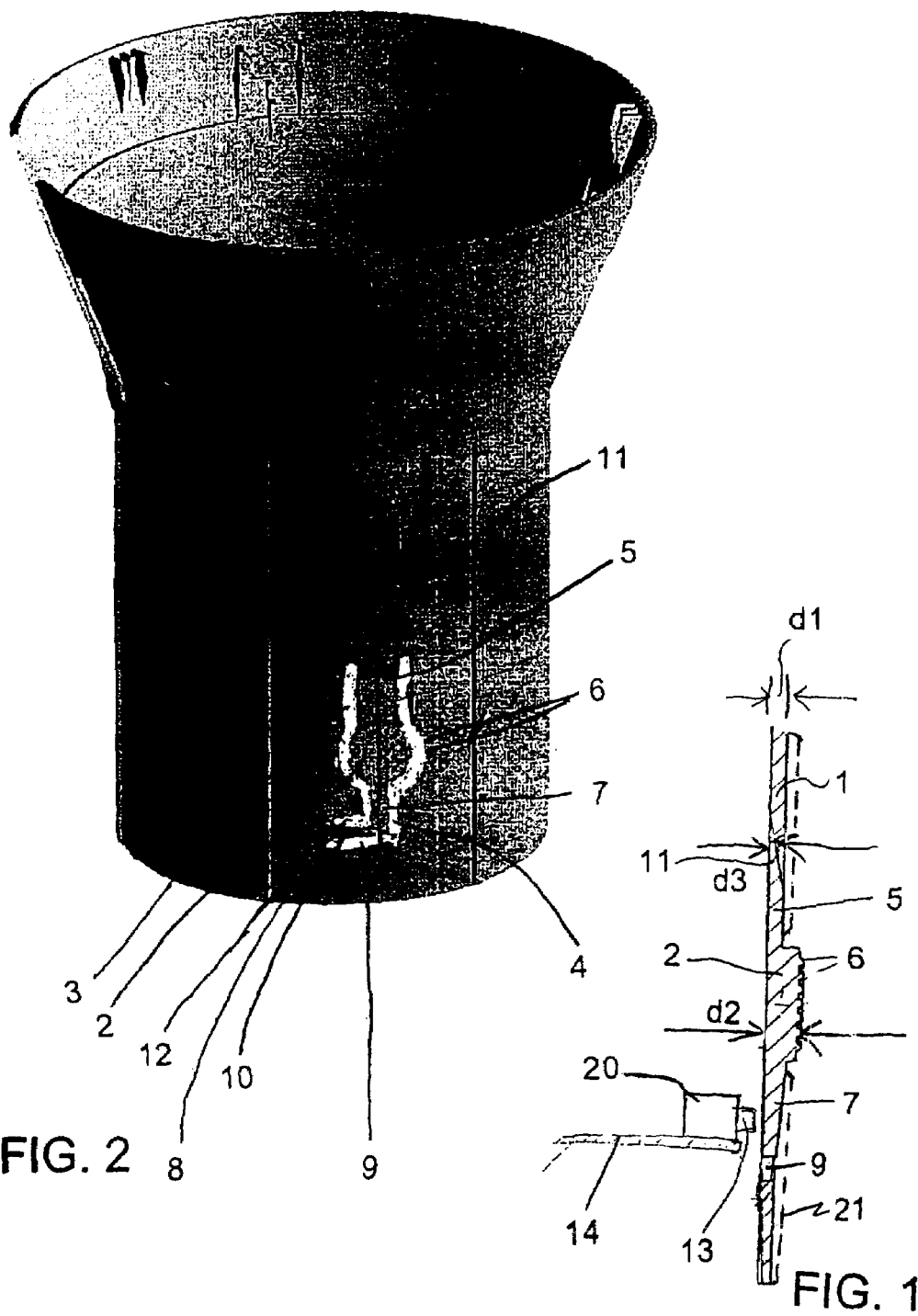

ELECTRICAL KITCHEN APPLIANCE

CROSS-REFERENCE TO RELATED APPLICATION

This application is a continuation, under 35 U.S.C. § 120, of copending international application No. PCT/EP02/09467, filed Aug. 23, 2002, which designated the United States; this application also claims the priority, under 35 U.S.C. § 119, of German patent application No. 101 42 503.1, filed Aug. 30, 2001; the prior applications are herewith incorporated by reference in their entirety.

BACKGROUND OF THE INVENTION

Field of the Invention

The invention relates to an electrical kitchen appliance, especially a fruit press, containing a drive unit and a housing.

A fruit press driven by an electric motor is known from European Patent EP 0 362 058 B1. The fruit press has a rotary switch and other switching devices disposed on the outside of its outer wall for actuating the fruit press.

SUMMARY OF THE INVENTION

It is accordingly an object of the invention to provide an electrical kitchen appliance that overcomes the above-mentioned disadvantages of the prior art devices of this general type, which can used in a simple manner.

With the foregoing and other objects in view there is provided, in accordance with the invention, an electrical kitchen appliance. The kitchen appliance contains an electrical switching device, and a housing having an outer wall made of an elastic material and has a first wall thickness. The outer wall forms a button for actuating the electrical switching device that is disposed inside the housing. The button is defined by a region of the outer wall that has a second wall thickness that is less than the first wall thickness. A drive unit is also disposed in the housing.

In a kitchen appliance of the type initially specified, the object is solved by the fact that that the housing has a first outer wall made of an elastic material with a first wall thickness. The outer wall forms a button for actuating an electrical switching device disposed inside the housing by forming a region having a second wall thickness that is less than the first wall thickness and/or by recessing a part of the outer wall.

According to the invention, it is possible to manufacture a button from the material of the outer wall itself without using additional parts that must then be connected to the outer wall at further expense. As a result, the kitchen appliance can be manufactured simply and quickly. The formation of the button takes place in a single manufacturing step with the formation of the outer wall. If the outer wall is made of plastic and manufactured in an injection molding process, the button is cast together with the outer wall as a whole. In this way, the button can be manufactured very cheaply. As a result of the integral combination of the outer wall and the button, there is also no need to use connecting elements between the button and the outer wall. The connection between the outer wall and the button is provided according to the invention by the regions of reduced wall thickness. If the injection mold is suitably adapted, the button can be provided at any point on the outer wall. It is to be understood that a plurality of buttons, and also different dimensioning on the outer wall of an electrical appliance, can also be applied.

In an advantageous further development the region has two first strips running substantially parallel to one another between which runs one second strip of the first wall thickness. The two first strips either have the second wall thickness or are constructed as recesses in the first outer wall. As a result of the recessing of the material of the outer wall or as a result of the thinner embodiment of the strips adjacent to the region in which the button is formed, compared with the remaining region of the outer wall, it is achieved that the elasticity of the material of the outer wall can be used to bend the region made of the same material but having a lesser wall thickness, towards the region of thicker wall thickness. If the outer wall has a convex shape, it is sufficient if the strips run in the direction of curvature of the surface of the outer wall and that the strips which are formed of less material, in order to be able to bend the region in between the same inwards.

It is preferable if the second strip of the first wall thickness is enlarged in a circular shape at one point. In this way the strip at the enlarged point can be used as a button. In addition, it is advantageous if this point has gripping pimples or bumps.

In a preferred variant, the kitchen appliance has two, third strips which also run substantially parallel to one another, which respectively adjoin the two first strips substantially at a right angle and which are constructed as recesses in the outer wall. As a result of this configuration of the strips, it is achieved that the material in the region of the button can be bent particularly well.

The strips on which the button is disposed and which have the same wall thickness as the outer wall, are separated from the outer wall by regions of lesser wall thickness which act as film hinges and enable slight pivoting of the button. As a result of the elasticity of the material from which the outer wall, the strips, the regions and the button are formed, the strips, the regions and the button are pivoted back into their initial position again after actuation of the button.

In order to avoid any damage to the first outer wall and prevent any contamination from penetrating into the interior of the kitchen appliance, a second outer wall is preferably pushed over the first outer wall, surrounding the first outer wall while leaving out a region occupying at least part of the surface of the button.

Other features which are considered as characteristic for the invention are set forth in the appended claims.

Although the invention is illustrated and described herein as embodied in an electrical kitchen appliance, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWING

FIG. 1 is a diagrammatic, sectional view through a section of an outer wall of a housing of an electrical kitchen appliance according to the invention; and FIG. 2 is a diagrammatic, perspective view of the outer wall.

DESCRIPTION OF THE PREFERRED EMBODIMENTS

Referring now to the figures of the drawing in detail and first, particularly, to FIG. 1 thereof, there is shown an outer wall 1 that has a wall thickness d1. Laterally above, laterally and laterally below a region surrounding a button 2, two recesses are provided in the outer wall 1, the recesses being constructed as strips 3 and 4 (see FIG. 2) The button 2 is disposed on a strip 5 that is formed between the strips 3 and 4 by the material of the outer wall 1. The button 2 has a wall thickness d2 that is preferably greater than the thickness d1 of the outer wall 1 and the strip 5. The thickness d2 is preferably selected such that the button 2 projects through a second outer wall 21, shown in dashed lines and enclosing the outer wall 1 from outside, and can be conveniently actuated by a user by pressing.

The button 2 has a circular shape and has pimples 6 on its outer surface, making the surface easier to grip and facilitating usage.

Below a strip 7 formed beneath the button 2 such that it adjoins thereto and is also formed by the intermediate space between the strips 3 and 4, the strips 3 and 4 go over into strips 8 and 9 running at right angles to the strips 3 and 4, which are also formed as recesses in the outer wall 1.

A strip 10 that has the thickness d1 of the outer wall 1 and adjoins the strip 7 at right angles, runs between the strips 8 and 9.

In order to achieve that the strips 5, 7 and 10 and thus with these, the button 2 can bend easily, regions 11 and 12 of reduced wall thickness d3 are provided at the transitions between the outer wall 1 to the strips 5 and 10 so that film hinges are formed in regions 11 and 12. The button 2 can be pressed inwards and is moved back into its original position as a result of the elasticity of the plastic forming the outer wall 1 and thus the strips 5, 7 and 10 as well as the button 2.

The button 2 actuates an electrical button 13 or a switch of a drive unit 20 disposed on a board 14 at right angles to the outer wall 1 in the interior of the kitchen appliance.

According to the invention the outer wall 1 is provided for an electrical kitchen appliance, which as a result of the formation of recesses, forms strips 5, 7 and 10 on which a button 2 is disposed. Since regions 11 and 12 embodied as film hinges are provided between the strips 5 and 10, the strips 5, 7 and 10 and thus the button 2 disposed in-between the same can pivot in order to actuate an electrical button 13 or a switch inside the housing of the kitchen appliance.

We claim:

1. An electrical kitchen appliance, comprising:
   an electrical switching device;
   a housing having an outer wall made of an elastic material, said outer wall forming a button for actuating said electrical switching device disposed inside said housing, said button defined by a pair of recesses provided in the outer wall; and
   a drive unit disposed in said housing.

2. The kitchen appliance according to claim 1, wherein said pair of recesses extend completely through said outer wall.

3. The kitchen appliance according to claim 2, wherein said pair of recesses have two first strips formed in said outer wall running substantially parallel to one another between which runs a second strip.

4. The kitchen appliance according to claim 3, wherein said second strip is enlarged in a circular shape at one point defining a circularly enlarged point.

5. The kitchen appliance according to claim 4, wherein said circularly enlarged point has gripping pimples.

6. The kitchen appliance according to claim 3, wherein said outer wall has additional recesses formed therein defining two third strips running substantially parallel to one another, and each of said third strips respectively adjoining one of said two first strips substantially at a right angle.

7. The kitchen appliance according to claim 6, wherein between said first strips and said third strips said outer wall having further regions of reduced wall thickness serving as film hinges.

8. The kitchen appliance according to claim 7, further comprising a further outer wall covering parts of said outer wall, said further outer wall not covering a region occupying at least part of a surface of said button.

9. The kitchen appliance according to claim 1, wherein said pair of recesses extend partially into said outer wall and include two first strips formed in said outer wall running substantially parallel to one another.

10. The kitchen appliance according to claim 9, further comprising a second strip running between said two first strips and being enlarged in a circular shape at one point defining a circularly enlarged point.

11. The kitchen appliance according to claim 10, wherein said circularly enlarged point has gripping pimples.

12. The kitchen appliance according to claim 9, wherein said outer wall has additional recesses formed therein defining two third strips running substantially parallel to one another, and each of said third strips respectively adjoining one of said two first strips substantially at a right angle.

13. The kitchen appliance according to claim 12, wherein between said first strips and said third strips said outer wall having further regions of reduced wall thickness serving as film hinges.

14. The kitchen appliance according to claim 13, further comprising a further outer wall covering parts of said outer wall, said further outer wall not covering a region occupying at least part of a surface of said button.

15. The kitchen appliance according to claim 9, wherein between said first strips and said outer wall having a region of reduced wall thickness serving as a film hinge.

16. A fruit press, comprising:
    an electrical switching device;
    a housing having an outer wall made of an elastic material, said outer wall forming a button for actuating said electrical switching device disposed inside said housing, said button defined by a pair of recesses provided in the outer wall; and
    a drive unit disposed in said housing.

17. An electrical kitchen appliance, comprising:
    an electrical switching device;
    a housing having an outer wall made of an elastic material, said outer wall forming a button for actuating said electrical switching device disposed inside said housing, said button including a strip having opposing ends connected to the outer wall and being defined by a first pair of recesses provided in the outer wall; and
    a drive unit disposed in said housing.

18. The kitchen appliance according to claim 17, wherein the opposing ends of the strip each have regions of reduced wall thickness serving as film hinges.

19. The kitchen appliance according to claim 17, further comprising a second pair of recesses running substantially parallel to one another, and each of said second pair of recesses respectively adjoining one of said first pair of recesses substantially at a right angle.

20. The kitchen appliance according to claim 17, wherein said strip is enlarged in a circular shape at one point defining a circularly enlarged point between said pair of recesses.

* * * * *